3,356,449
PREPARATION OF SODIUM TRISILICATE
Robert J. Shoaff, Midland, Mich., assignor to The Dow Chemical Company, Midland, Mich., a corporation of Delaware
No Drawing. Filed Oct. 1, 1964, Ser. No. 400,944
8 Claims. (Cl. 23—110)

This invention relates to sodium silicates, and more particularly is concerned with a method for preparing sodium trisilicate ($Na_2Si_3O_7$) in the form of crystals, pellets, or as a solid mass.

Sodium trisilicate finds particular utility as an adhesive and an alkaline scouring powder.

It is a principal object of the instant invention to provide a method of preparing sodium trisilicate which product can be recovered in the form of uniformly sized and shaped pellets, as crystals or as a solid mass.

Other objects and advantages of the instant invention will become apparent from reading the detailed description thereof disclosed hereinafter.

In general the instant method for preparing sodium trisilicate comprises providing an aqueous mixture containing at least one silica value-containing compound selected from the group consisting of silica and sodium metasilicate and sodium hydroxide wherein the mixture contains from about 0.25 to about 20 percent by weight silica value-containing compounds and a corresponding predetermined quantity of sodium hydroxide such that the weight ratio of sodium hydroxide to silica values in said reaction mixture, expressed as $Na_2O/SiO_2$, is within the range of from about 1 to about 1.5. Substantially anhydrous ammonia, either liquid or gaseous, is then mixed with the mixture in an amount so that the final ammoniated reaction mass contains from about 10 to about 15.8 percent by weight ammonia. The ammoniated mass is maintained at a temperature within the range of from about 140° to about 250° C. for a period of from about 10 minutes to about 8 hours and at pressures of from about 680 to about 950 p.s.i.g. During this reaction period substantially anhydrous sodium trisilicate precipitates directly in the reaction mixture. The product is separated from the residual mixture as for example, by decanting filtering, centrifuging or other liquid-solid separatory procedures, and the solid product recovered.

In carrying out a preferred variation of the instant method the silica values supplied as an aqueous mixture containing from about 4 to about 6 weight percent silica ($SiO_2$), or a sodium metasilicate solution containing from about 10 to about 14 weight percent $Na_2SiO_3$ are placed in a pressurizable reactor vessel such as an autoclave equipped with a stirrer or agitator. A corresponding predetermined quantity of sodium hydroxide is added to the mixture so that the mixture contains a weight ratio of sodium hydroxide to silica present in the reaction mixture, expressed as $Na_2O/SiO_2$, in a range of from about 1.025 to about 1.05. Next, anhydrous ammonia is slowly introduced into the autoclave to provide an amount of from about 11 to about 14.5 percent by weight ammonia in the composition. The autoclave is then heated at a temperature of from about 200° to about 210° C. for about 30 minutes. During the reaction period a pressure of from about 600 to about 800 p.s.i.g. is allowed to build up in the autoclave. As the reaction proceeds over this period, a precipitate forms in the aqueous reaction mixture which is separated therefrom, washed, and then dried. The resulting product is a substantially anhydrous sodium trisilicate.

Unexpectedly in the present novel process it has been found that the sodium trisilicate can be recovered as a hard mass, uniform sized and shaped pellets or as crystals, depending upon the degree of ammoniation of the silica values-containing solution. Thus, where the silica value and sodium hydroxide solution is treated with ammonia so that the final solution contains from about 10 to about 11.9 percent by weight $NH_3$, the trisilicate will be formed as a hard mass. Where the solution contains from about 12 to about 14 percent by weight $NH_3$, the product will be formed as relatively uniformly sized and shaped pellets each pellet being, for example, about 5 millimeters in length, about 3 millimeters around at its widest point and weighing about 1.8 grams/100 pellets. Ammoniating the solution to produce a concentration of from about 14.1 to about 15.8 percent by weight $NH_3$ will produce a crystalline trisilicate product.

The starting materials for the instant method can be obtained from various and numerous sources. Silica in a relatively pure state can be obtained from sands. Solutions of sodium metasilicate can be obtained by reacting aqueous solutions of sodium hydroxide and silica under a temperature of from about 150° C. to about 300° C. and a pressure of from about 30 to about 500 p.s.i.g.

Commercially available caustic solution obtained from the electrolysis of brines conveniently serves as a ready source of NaOH. However, these brines ordinarily contain large amounts of sodium chloride, sodium sulfate and other salts, some of which are present in the solid sodium hydroxide reactant. These are not detrimental in the present process. In fact unexpectedly, it has been found that in the present process the presence of sodium chloride in the reaction mixture in amounts of from about 0.1 percent by weight up to its saturation point in the reaction mixture is not detrimental to the recovery of a substantially pure product but in fact, aids in the formation of the solid sodium trisilicate product in the reaction mixture. If any of these impurities are found to be present in the precipitated sodium trisilicate product, they easily are removed therefrom by first washing said product with ammonia solutions and then with methanol.

The following examples are merely illustrative of the instant invention and in no way are meant to limit it thereto.

*Example 1*

About 600 grams of chlorine cell effluent sodium hydroxide containing about 49.32 grams of NaOH, about 96 grams of NaCl, about 6 grams of $Na_2SO_4$, with the remainder being $H_2O$, along with about 33.6 grams of $SiO_2$ were introduced into an autoclave equipped with a rotary blade stirrer at a temperature of about 20° C. About 86 grams of anhydrous ammonia were next introduced into the autoclave and mixed with the silica-hydroxide mixture. The temperature of the so-treated mixture was heated to and maintained at about 210° C. for about 30 minutes under a pressure of about 810 p.s.i.g. The contents of the autoclave were then cooled to about 20° C. and filtered. A particulate product comprising substantially of uniform pellets about 5 millimeters long and about 3 millimeters wide was recovered, washed with equal cake volumes of 28 percent ammonia and methanol and then dried in an oven at 110° C. for about 120 minutes.

The dry product weighed about 39 grams and when analyzed, found to contain the following:

| | Percent by weight (about) |
|---|---|
| $Na_2Si_3O_7$ | 89–90 |
| NaCl | 0.1 |
| $SiO_2$ | 10–20 |

Thus it is seen that about 75 percent of the silica values originally introduced into the autoclave was recovered as substantially anhydrous sodium trisilicate pellets uniform in size and shape.

The product recovered can be further purified by washing it with aqueous ammonia and then with methanol.

*Example II*

About 735 grams of chlorine cell effluent sodium hydroxide containing:

| | Grams (about) |
|---|---|
| NaOH | 62.5 |
| $Na_2SO_4$ | 7.3 |
| NaCl | 117.5 |
| $H_2O$ | Balance | along with about 48 grams of $SiO_2$ were introduced into the autoclave described in Example I. About 125 grams of $NH_3$ (anhydrous) were next introduced into the autoclave and mixed with the silica-sodium hydroxide mixture. The temperature of the so-treated mixture was heated to and maintained at about 210° C. for about 30 minutes under a pressure of about 900–1000 p.s.i. The contents of the autoclave were then cooled to about 20° C. and filtered. A crystalline product was recovered, then dried in an oven at 110° C. for about 120 minutes.

The dry cake in the form of crystals weighed about 81.0 grams and when analyzed, found to contain the following:

| | Percent (about) |
|---|---|
| $Na_2Si_3O_7$ | 60–70 |
| $Na_2SiO_3$ | 10–20 |
| NaCl | 5–15 |
| $SiO_2$ | <5 |

Thus it can be seen that about 82.8 percent of the silica values originally introduced into the autoclave was recovered as substantially anhydrous sodium trisilicate in the crystalline form.

The sodium trisilicate product can be further purified by washing it with aqueous ammonia and then with methanol.

*Example III*

About 761.4 grams of $Na_2SiO_3$ solution containing:

| | Grams (about) |
|---|---|
| $Na_2SiO_3$ | 93.2 |
| NaCl | 104.5 |
| $Na_2SO_4$ | 6.0 |
| $H_2O$ | Balance | were placed into the autoclave described in Example I. About 137 grams of anhydrous ammonia were next introduced into the autoclave and mixed with the sodium metasilicate solution. The temperature of the so-treated solution was heated to and maintained at about 210° C. for about 15 minutes under a pressure of about 800–900 p.s.i. The contents of the autoclave were cooled to 20° C. and the mother liquor decanted. A very tacky precipitate was recovered.

The precipitate weighed about 73.8 grams and when analyzed, found to contain the following:

| | Percent (about) |
|---|---|
| $Na_2Si_3O_7$ | 60+ |
| NaCl | 10–20 |
| $Na_2SO_4$ | 5 |
| $H_2O$ | Remainder |

Thus it is seen that about 72 percent of the silica values originally introduced into the autoclave was recovered as anhydrous sodium trisilicate as a hard extremely tacky mass. This product can be purified by washing it with ammonia and then with methanol.

*Example IV*

About 735 grams of chlorine cell effluent sodium hydroxide containing:

| | Grams (about) |
|---|---|
| NaOH | 62.5 |
| $Na_2SO_4$ | 7.3 |
| NaCl | 11.75 |
| $H_2O$ | Balance | along with 45 grams of $SiO_2$ were introduced into the autoclave. About 100 grams of anhydrous ammonia were next introduced into the autoclave and mixed with the silica-sodium hydroxide mixture. The temperature of the so-treated mixture was heated to and maintained at about 210° C. for about 45 minutes under a pressure of about 600–700 p.s.i. The contents of the autoclave were then cooled to about 20° C. and the mother liquor decanted. A very tacky precipitate was recovered which analyzed to be substantially $Na_2Si_3O_7$.

Various modifications can be made in the method of the instant invention, for it is to be understood that I limit myself only as defined in the appended claims.

What is claimed is:

1. A method of preparing anhydrous sodium trisilicate from aqueous silica value-containing mixtures which comprises:
   (a) providing an aqueous mixture containing at least one silica value-containing compound selected from the group consisting of silica and sodium metasilicate and in an amount so that said aqueous mixture contains from about 0.25 to about 20 percent by weight silica values and a corresponding predetermined quantity of sodium hydroxide such that the weight ratio of sodium hydroxide to silica values in said mixture, expressed as $Na_2O/SiO_2$, is within the range of from about 1 to about 1.5;
   (b) mixing anhydrous ammonia with said aqueous mixture, said ammonia being present in an amount of from about 10 to 15.8 percent by weight of the final ammoniated reaction mixture maintaining the temperature of said reaction mixture under pressure within the range of from about 140° to about 250° C. for a period of from about 10 minutes to about 8 hours thereby precipitating out substantially anhydrous sodium trisilicate; and
   (c) separating and recovering said substantially anhydrous sodium trisilicate from the residual mixture.

2. The method in accordance with claim 1 wherein said ammonia is added in amounts of from about 11 to about 14.5 percent by weight of the total ammoniated reaction mixture and said mixture is maintained at a temperature of from about 200 to about 210° C.

3. The method in accordance with claim 1 wherein the silica value-containing reactant is silica and is present in said reaction mixture in an amount of from about 5 to about 6 percent by weight.

4. The method in accordance with claim 1 wherein the silica value-containing reactant is sodium metasilicate and is present in said reaction mixture in an amount of from about 10 to about 14 percent by weight.

5. The method in accordance with claim 1 wherein said ammonia is added in an amount to provide a total ammonia content of from about 10 to about 11.9 percent by weight of the total ammoniated reaction mixture.

6. The method in accordance with claim 1 wherein said ammonia is present in an amount of from about 12 to about 14 percent by weight of the total ammoniated reaction mixture.

7. The method in accordance with claim 1 wherein said ammonia is present in an amount of from about 14.1 to 15.8 percent by weight of the total ammoniated reaction mixture.

8. The method in accordance with claim 1 wherein the sodium hydroxide-silica values aqueous mixture contains sodium chloride in an amount of from about 0.1 percent by weight up to that amount needed to saturate the mixture.

References Cited

UNITED STATES PATENTS 2,830,876   4/1958   Mockrin et al. _____ 23—110

OSCAR R. VERTIZ, *Primary Examiner.*

EARL C. THOMAS, *Examiner.*

A. J. GREIF, *Assistant Examiner.*